March 7, 1944.  L. D. BAVER ET AL  2,343,520
METHOD OF MEASURING MOISTURE
Filed June 12, 1940  2 Sheets-Sheet 1
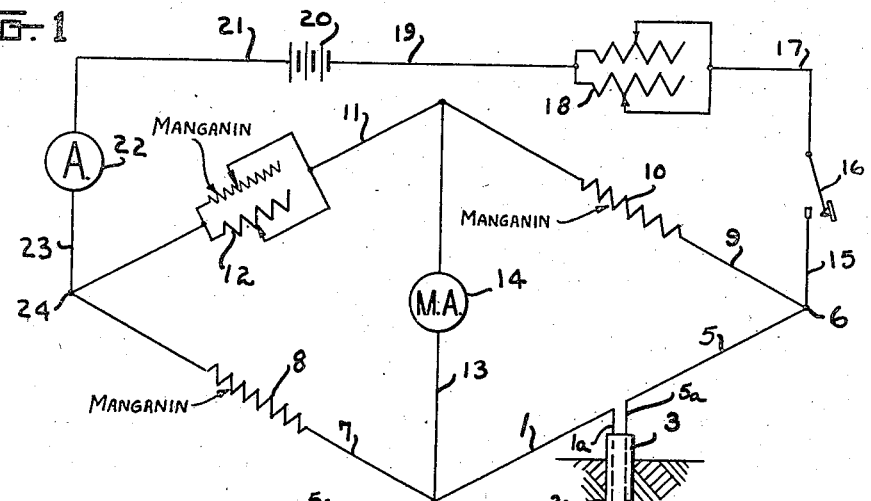
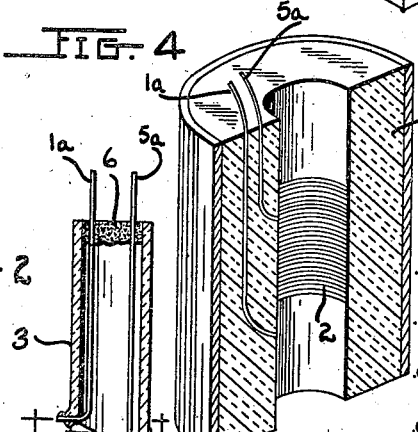
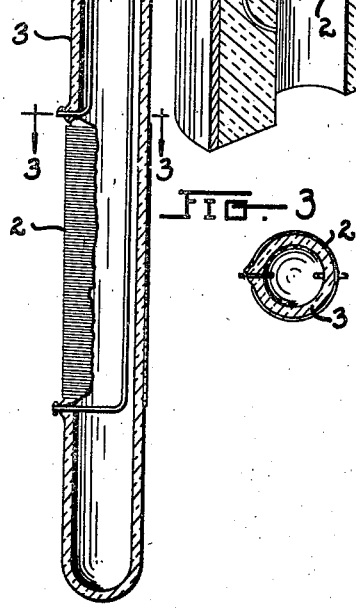
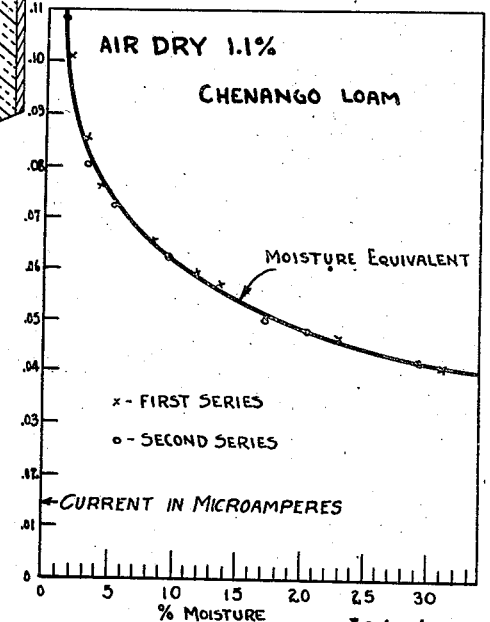
Inventors
LEONARD D. BAVER
BYRON T. SHAW
Attorneys March 7, 1944.  L. D. BAVER ET AL  2,343,520

METHOD OF MEASURING MOISTURE

Filed June 12, 1940   2 Sheets-Sheet 2

Inventors
LEONARD D. BAVER
BYRON T. SHAW
by
Attorneys

Patented Mar. 7, 1944

2,343,520

UNITED STATES PATENT OFFICE 2,343,520

METHOD OF MEASURING MOISTURE

Leonard D. Baver and Byron T. Shaw, Columbus, Ohio, assignors to The Ohio State University Research Foundation, Columbus, Ohio, a corporation of Ohio Application June 12, 1940, Serial No. 340,170

2 Claims. (Cl. 73—51)

Our invention relates to an improved method for measuring moisture.

It is the object of our invention to measure moisture in materials, particularly in such materials as soils, soaps, grains, flour, clays, paper and the like.

It is the object of our invention to provide a method for determining heat conductivity in materials as an index of moisture in the materials.

It is an object of this invention to provide a simple method of measuring the changes in heat conductivity of materials in order to determine the moisture content thereof.

It is a further object to provide an improved method of measuring moisture in such a manner that salts in solution and in the material to be measured, as in soils, will not affect the measurement.

It is a further object to provide a method for measuring changes in the heat conductivity of materials having various moisture contents.

It is an object to use heat conductivity as an index of the moisture content of materials.

Heretofore electrical conductivity methods of measuring moistures in soils and other materials have failed because the conductivity of the soil at a given moisture content varies greatly with changes in the salt concentration of the soil solution. We have discovered that heat conductivity is not materially affected by the presence of ions in solution since rather large changes in the concentration of a dilute salt solution have very little influence on the thermal conductivity.

We have further discovered that the heat conductivity of a dry porous medium such as soil must of necessity be low as the solid materials make only point contacts. The area for continuous heat flow through soil materials is very small.

A negligible amount of the heat is conducted by the air in the pores, since air is a much poorer conductor than the soil solids. As water is added to the soil, the area through which heat can flow will increase tremendously since the water will form wedges around the points of contact. Water is not as good a conductor of heat as the solid soil material, but it is a far better conductor than air.

We therefore have found that the heat conductivity of a soil or other materials would increase with its moisture content; and this is independent of any salts which will be present in varying quantities in the moisture in the soil.

It is a further object in our method to utilize a relatively brief interval for measurement in the soil or other materials as we have discovered that moisture begins to move away from the point of measurement as soon as our heating element begins to heat up.

It is an object of this invention to utilize an amount of heat that is not large enough to cause any appreciable moisture movement.

It is an object of this invention to provide a method by which heat conductivity can be used as an index of soil or other material moisture, since the conductivity of the materials increase with their moisture content.

It will be understood that the term "soil" is used generically and it is understood to cover any materials capable of being measured as indicated herein.

Referring to the drawings:

Figure 1 is a diagrammatic view of an instrument of our invention.

Figure 2 is a detailed view partially in section of the heating coil to be immersed into the materials whose moisture should be measured.

Figure 3 is a section on the line 3—3 looking in the direction of the arrows on Figure 2.

Figure 4 is a view, in section, of a modified form of the heat measuring device in which the materials whose moisture is to be measured pass through the center of the coil instead of surrounding the outside of it.

Figure 5 is a chart indicating a moisture calibration curve for a typical soil such as chenango loam.

Figure 6:
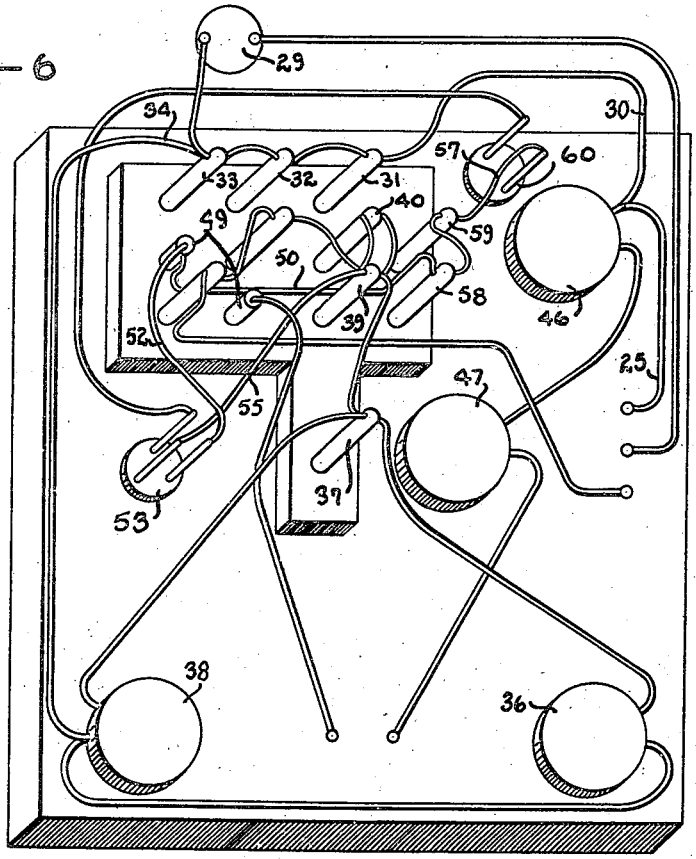
Figure 6 is an isometric view of the wiring arrangement of the back of a typical measuring instrument.

Referring to the drawings in detail:

Figure 1 shows an instrument operated on the basis of heat conductivity by means of which it is possible to follow the moisture changes in the soil or other materials over substantially the entire range of the moisture content thereof. It can be seen that the arrangement is that of a Wheatstone bridge. The sensitivity of the instrument is very nearly proportionate to the cube of the current flowing through the bridge.

It is very important therefore to keep the current constant during the course of a determination.

Before describing the operation of this instrument by which it is first calibrated and then operated to determine moisture content, we proceed to the description of the construction of the instrument in Figure 1.

Apparatus for carrying out the method

An arm 1 of the Wheatstone bridge is extended into a coil 2 which is inserted into the materials to be measured and is mounted around an insulation core 3 as in Figures 1, 2 and 3, or is mounted within an insulation core 4 as in Figure 4. This coil consists in a typical instrument of No. 40 enameled copper wire wound on a 6-mm. glass or Bakelite tubing designated 3. The other end of the coil 2 is connected by the leg portion 5 to the terminal 6.

It should be noted that in the construction of this coil 2 that it is connected at its respective ends by the wires 1a and 5a which are leads of relatively large copper wire that go through the walls of the insulation tubing 3 and are soldered to the fine wire 2 on the exterior of the tube. The connections are enameled and the tube is sealed water tight by the seal 6. The resistance of this arm is about 7 ohms at zero degrees F. The leg 7 of the Wheatstone bridge contains a coil of manganin wire of about 7 ohms as at 8. The leg 9 contains a similar coil 10 of about 200 ohms. The leg 11 contains a variable resistance generally designated 12 which is in parallel with a manganin resistance of about 200 ohms.

This bridge is provided with a bias circuit 13 in which is located a microammeter 14. This completes the measuring circuit.

The calibrating circuit consists of the wire 15, a switch 16, a wire 17, a variable resistance 18, a wire 19, a six volt battery 20, the wire 21 and ammeter 22 in the battery circuit which is connected by the wire 23 to the terminal 24 of the legs 7 and 11 of the bridge.

It will be observed in this arrangement that the resistance of the coil 2 increases with its temperature, but the other three resistances being made of manganin wire are not influenced by temperature changes. In balancing the bridge a small current of about 0.02 ampere is used so that the heat developed in the coil 2 can be dissipated in the soil without causing the temperature to rise. The circuit is made and broken immediately. The variable resistance 12 is varied until no current flows through the microammeter. The bridge remains in balance as long as the temperature of the coil 2 remains constant. When the temperature of the soil or other material surrounding the coil 2 changes, a new value of resistance 12 is obtained at the balanced condition. Thus, it can be seen that the value of resistance 12 at balance is an index of the soil temperature; and, in fact, if a current of 0.1 ampere or more is allowed to flow through the bridge continuously after a balance has been obtained, the bridge is thrown out of balance allowing a current to flow through the microammeter 14. This is due to the fact that heat is being developed at the coil 2 faster than it can be conducted away by the soil, so that, as a result, the temperature of the coil 2 rises. This temperature continues to rise until it reaches a point at which heat is lost as fast as it is gained. The current through the microammeter 14 increases with the temperature of coil 2. The magnitude of the current over equilibrium reflects the increase in temperature. It can be seen that the heat conductivity of the soil is the factor that controls the temperature rise. If the conductivity is low the temperature rise will be large, and if the conductivity is high the temperature rise will be small. Since the heat conductivity of a soil or other material increases with its moisture content, the size of the current through the microammeter is an index of the amount of moisture in the soil. It is not necessary to keep the current flowing until the equilibrium condition has been reached. A microammeter reading taken at any arbitrary time after the current has been turned on serves equally as well.

In order to calibrate the instrument and check the results, the following procedure is found satisfactory.

Calibration methods

Soil was placed in a cylindrical woven-wire container lined with linen. The measuring element or coil 2 was then inserted vertically into the center of the soil column. The container was placed in water over night to allow the soil to become saturated. Upon removal from the water the container was placed on a towel to drain. A pasteboard carton, slightly larger than the soil assembly, was placed over the soil so as to reduce evaporation to a minimum. At such a time as it was felt that the excess water had drained away the leads from coil 2 were connected to the bridge proper and a balance obtained. A current of 0.4 ampere was then passed through the bridge for one minute at which time the current through the microammeter was read. The leads were then disconnected and the entire soil assembly, excluding the pasteboard cover, weighed. Since the weight of the soil was known as well as the weight of the container and the measuring element, it was possible to calculate the moisture content of the soil at the time the reading was taken. This particular type of container was chosen so that only a negligible amount of water would be in its walls and the excess weight could be assumed to be water actually in the soil. It was necessary to have porous walls so that evaporation could proceed on all sides and thus keep the moisture distribution in some semblance of uniformity. After weighing, the soil was allowed to stand uncovered until the following morning. During this time interval, water was lost by evaporation. The cover was then placed over the container in order to slow up evaporation. A new reading was obtained sometime during the afternoon and then the whole process was repeated for as many days as was necessary to bring the soil to the air-dry state. At this time the soil was resaturated and the whole process repeated. It is not to be inferred that readings can only be taken once each day, for on many occasions readings were taken as often as every 20 minutes. The procedure described was merely a routine that fitted into the day's work.

The result of this method of calibration is shown in the chart, Figure 5, where the vertical column indicates the amount of direct current microamperes and the horizontal column is graduated in degrees of percent of moisture. This curve was taken in connection with chenango soil and the moisture determination thereof is a result of the calibration tests which are indicated by cross marks as the first series, while the circles indicating the second series of tests indicate the actual soil tests. It will be readily appreciated that the microammeter may be designed to read in percentages of moisture when suitably so calibrated.

While the relationship between heat conductivity and moisture content are distinct for each soil, yet all of the curves that we have made have some features in common. The increase in heat conductivity (a decrease in the detector current) with moisture is rather gradual in the high moisture ranges and very rapid in the low moisture range.

In field measurements, the coil 2 can be left in the soil or other materials permanently, if desired, while the remaining parts of the apparatus may be placed in a portable box as indicated in Figure 6. This apparatus can be plugged in at the time of reading. By such an arrangement it is possible to have a large number of elements such as the coils 2 placed at various locations which can be read with one bridge.

It has been stated that this method depends upon the changing heat conductivity of the soil with moisture, but it must be added that the changing heat capacity of the soil-water system also has a small effect upon the readings. By heat capacity we mean the amount of heat necessary to change a material one degree in temperature. As the soil decreases in moisture, the conductivity and capacity are both lowered. In addition to the greater rise in temperature of the soil element, due to the decreased conductivity in the lower moisture ranges, a further increase in temperature will be caused since a smaller amount of the heat escaping will be required to produce a given change in the temperature of the soil in the neighborhood of the element. This effect of heat capacity is of only secondary importance, but since it is in the same direction as the conductivity effect it helps to increase the sensitivity of the method.

The first criticism of any method of moisture measurement based on applying heat is likely to be predicated on the fact that moisture will move away from the point at which heat is applied. The fact that moisture moves cannot be denied; however, the amount of movement depends upon both the temperature of the heat source (relative to the soil) and the length of time the heat is applied. If the temperature difference between the source and the soil and the time interval are both small then the amount of moisture movement will also be small. The temperature of the source (size of current) and time interval were so chosen that the amount of moisture movement can be considered negligible.

As the sensitivity of the apparatus is roughly proportional to the cube of the current through the bridge, it is important that the current be kept constant during the progress of a determination.

Figure 7:
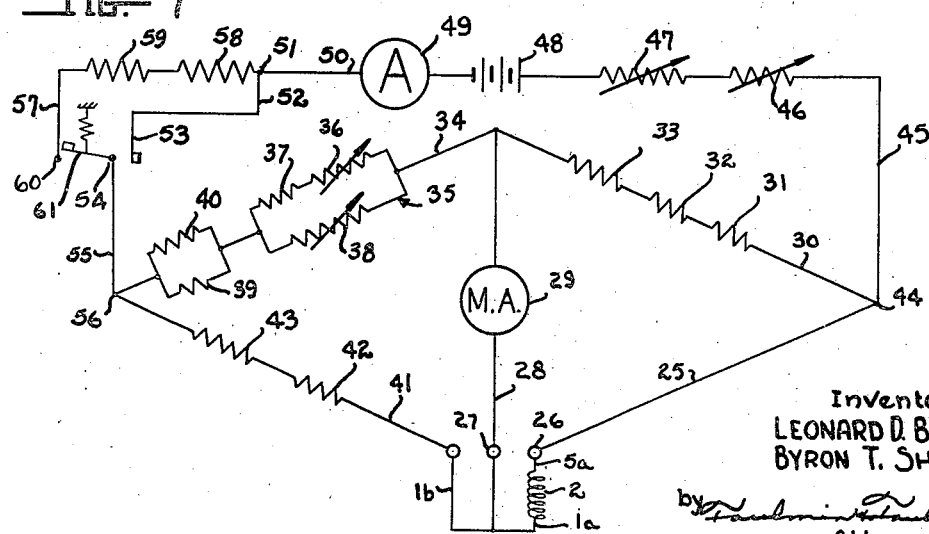
Figure 7 is a diagrammatic view of a wiring arrangement of an alternative form to that shown in Figure 1 for the practice of the method of this invention.

With reference to Figures 6 and 7, this modified circuit is arranged as follows. 25 designates a leg of the Wheatstone bridge to one terminal of which at 26 is attached the wire 5a of the coil 2. The other terminal of the coil 2, i. e., the wire 1a is attached to the terminal 27 of the cross-wire 28 containing the microammeter 29. An auxiliary lead 1b is attached to the coil 2 for the purpose of compensating for temperature fluctuations along the leads 5a and 1a. This is particularly valuable when long leads are necessary. The leg 30 contains the 1 ohm resistance 31, the 5 ohm resistance 32 and the thirty ohm resistance 33. The leg 34 contains the variable resistance 35 consisting of 30 ohm variable resistance 36 and a 30 ohm resistance 37 in series which in turn are in parallel with the adjustable 15 ohm resistance 38. Also interposed in the leg 34 are parallel resistances 39, which is a 30 ohm resistance, and a 200 ohm resistance 40. The leg 41 contains a 2 ohm resistance 42 and a 5 ohm resistance 43. The terminal 44 has connected to it the wire 45 in which is a half ohm adjustable resistance 46 and a 20 ohm adjustable resistance 47. In this circuit is also included a six volt battery 48 and ammeter 49. The ammeter 49 is connected by a wire 50 to the terminal 51. One wire 52 proceeds to a switch 53 which is closed by closing the switch on the terminal 54 of the wire 55 connected to the terminal 56. The other leg of the circuit connected to the terminal 51 is a balancing bridge circuit comprising a wire 57 in which are connected a 100 ohm resistance 58 and a 200 ohm resistance 59. The terminal 60 of this wire 57 can be intimately engaged by a switch blade 61, through which it is possible to momentarily close the circuit for determining the zero setting of the bridge. When this setting is once accomplished, then the switch 53 can be closed while the balancing circuit is left out of circuit; then the reading can be taken to indicate the moisture content of the material in terms of heat conductance or heat capacity as indicated on the microammeter.

*Method of operation*

In operating the apparatus of this invention according to our method we perform the following steps:

(a) We insert the coil 2 in the material the moisture in which is to be measured or we pass such material through the interior of the coil by utilizing a structure such as shown in Figure 4. If the latter structure is used the material may be passed continuously through the passageway within the coil 2.

(b) Then the bridge is balanced with a small current from the balancing or calibrating circuit by the closing of the switch in the balancing circuit and thereby supplying a small amount of current until the microammeter reads zero. The instrument is adjusted until it so reads.

(c) After reaching a zero balance we then close the switch again and pass the full current for a substantial period of approximately one minute. Then we read the microammeter deflection which is an index of the moisture content, in accordance with the previous calibration originally made as to the amount of moisture in the material being measured which will give such a reading. If the medium being tested is moving, as in the case of a body of such material passing through the inside of coil 2, then the circuit can be kept closed and the variations in moisture content of the medium read on a microammeter.

It will be thus noted that the heat conductivity of the material being measured is a function of its moisture content, i. e., the heat conductivity varies with the moisture. Or, stated in another way, the variation in moisture content will vary with the heat conductivity or heat capacity.

In operating any one of these circuits and mechanisms in accordance with our method, it is desirable to first bring the circuit to a zero reading and then again close the circuit in order to read the moisture content.

In balancing the bridge a small current of about 0.02 ampere is used so that the heat developed in coil 2 can be dissipated in the soil without causing the temperature to rise. (The circuit is made and broken immediately.) Resistance 12 is adjusted until no current flows through the microammeter. The bridge remains in balance as long as the temperature of coil 2 remains constant. When the temperature of the soil changes, a new value of resistance 12 is obtained at the balanced condition. Thus, it can be seen that the conductivity of coil 2 at balance is an index of the soil temperature; in fact, the resistance box could be calibrated in degrees, if desired.

If a current of 0.1 ampere or more is allowed to flow through the bridge continuously after a balance has been obtained, the bridge is thrown out of balance, thus allowing a current to flow through the microammeter. This is due to the fact that heat is being developed at coil 2 faster than it can be conducted away by the soil; as a result, the temperature of coil 2 rises. Its temperature continues to rise until it reaches a point at which heat is lost as fast as it is gained. The current through the microammeter increases with the temperature of coil 2. The magnitude of the current at equilibrium reflects the increase in temperature. It can be seen that the heat conductivity of the soil is the factor that controls the temperature rise. If the conductivity is low the temperature rise will be large, and if the conductivity is high the temperature rise will be small. Since the heat conductivity of a soil increases with its moisture content, the size of the current through the microammeter is an index of the amount of moisture in the soil. It is not necessary to keep the current running until the equilibrium condition has been reached. A microammeter reading taken at any arbitrary time after the current has been turned on serves equally as well.

It will be understood that we desire to comprehend within our invention such modifications as come within the scope of the claims and the invention.

It will be further understood that there exists a number of conductors whose resistances are functions of temperature. It is understood that we comprehend within our invention the use of these thermal resistors and that instead of measuring the change in current passing through two arms of a bridge, a change in current flowing through a thermistor may be a suitable device for measuring moisture content. A thermistor of suitable character has been described in the "Bell laboratories record" for July, 1940, vol. XVIII, No. 11 at page 325. The material of the thermistor may be constituted of silicon carbide, but we prefer to use uranium oxide or uranium sulphide. A thermistor is characterized by a rapid increase in resistance with temperature.

It is further understood that, since the rate of evaporation of water from a vessel depends upon the relative humidity of the atmosphere, current flowing through a resistance coil in the base of a shallow vessel containing water may serve as a humidostat, and that the magnitude of the current will be a function of the rate of evaporation of the water from the vessel, which in turn, will depend upon the relative humidity. Our invention is adaptable to such measurements.

Having thus fully described our invention, what we claim as new and desire to secure by Letters Patent is:

1. The method of determining moisture content of a substantial body or area of material, comprising inserting into the material at selective representative points similar resistance units each having terminals exposed for the connection of an indicating instrument, permitting the coils to obtain temperature equilibrium with said material, then successively passing current through each of said coils and so choosing the size of the current and the time interval in which said current is applied that the amount of moisture movement away from each coil is negligible, and correlating the readings afforded by the several coils that the moisture contents which said readings signify as an index of the average moisture content of the material.

2. The method of determining moisture content of a substantial body or area of material, comprising inserting into the material at selective representative points and at different depths similar resistance units each having terminals exposed for the connection of an indicating instrument, permitting the coils to obtain temperature equilibrium with said material, then successively passing current through each of said coils and so choosing the size of the current and the time interval in which said current is applied that the amount of moisture movement away from each coil is negligible, and correlating the readings afforded by the several coils that the moisture contents which said readings signify as an index of the average moisture content of the material.

LEONARD D. BAVER.
BYRON T. SHAW.